United States Patent
Bergmann et al.

(10) Patent No.: US 9,579,855 B2
(45) Date of Patent: Feb. 28, 2017

(54) SECONDARY GROOVE FOR WORK PIECE RETENTION DURING MACHINING

(71) Applicant: Spirit AeroSystems, Inc., Wichita, KS (US)

(72) Inventors: Blaise Francis Bergmann, Clearwater, KS (US); Joseph Lynn Michelucci, Kinston, NC (US)

(73) Assignee: Spirit AeroSystems, Inc., Wichita, KS (US)

( * ) Notice: Subject to any disclaimer, the term of this patent is extended or adjusted under 35 U.S.C. 154(b) by 162 days.

(21) Appl. No.: 14/570,317

(22) Filed: Dec. 15, 2014

(65) Prior Publication Data

US 2016/0167317 A1  Jun. 16, 2016

(51) Int. Cl.
*B29C 70/54* (2006.01)
*B29C 70/30* (2006.01)
*B29K 105/08* (2006.01)

(52) U.S. Cl.
CPC ........... *B29C 70/545* (2013.01); *B29C 70/30* (2013.01); *B29K 2105/0872* (2013.01)

(58) Field of Classification Search
CPC ... B79C 70/541; B79C 70/543; B79C 70/545; B79C 70/56
See application file for complete search history.

(56) References Cited

U.S. PATENT DOCUMENTS

| | | | | |
|---|---|---|---|---|
| 5,182,065 A | * | 1/1993 | Piotrowski | B29C 33/0044 264/153 |
| 5,520,758 A | * | 5/1996 | Kelman | B29B 11/16 156/245 |
| 5,746,553 A | * | 5/1998 | Engwall | B23Q 3/086 156/245 |
| 2002/0160068 A1 | * | 10/2002 | Nakamura | B29C 31/002 425/112 |
| 2004/0217497 A1 | * | 11/2004 | Engwall | B29C 70/545 264/40.1 |
| 2005/0051262 A1 | * | 3/2005 | Erickson | B29C 70/342 156/245 |

FOREIGN PATENT DOCUMENTS

FR           2419150 A1 * 10/1979 ........... B29C 51/004
GB  WO 2012038747 A1 *  3/2012 ........... B29C 70/545

* cited by examiner

*Primary Examiner* — William Bell
(74) *Attorney, Agent, or Firm* — Hovey Williams LLP

(57) ABSTRACT

A cure tool assembly and method of manufacturing a composite part. The cure tool assembly may include a rigid cure tool having a cutter groove and a securing groove formed therein. The cutter groove may be spaced apart from and formed around the cutter groove. The securing groove may be slanted inward, away from a peripheral edge of the rigid cure tool. The cure tool assembly may also include a first sacrificial material located in the cutter groove and a second sacrificial material located in the securing groove. Composite material placed onto the outer surface of the rigid cure tool may bond with the second sacrificial material during cure, creating a desired hold-down force to keep the composite material in place. The resulting cured part may be cut along the cutter groove, thus cutting through the composite material and into the first sacrificial material.

19 Claims, 4 Drawing Sheets

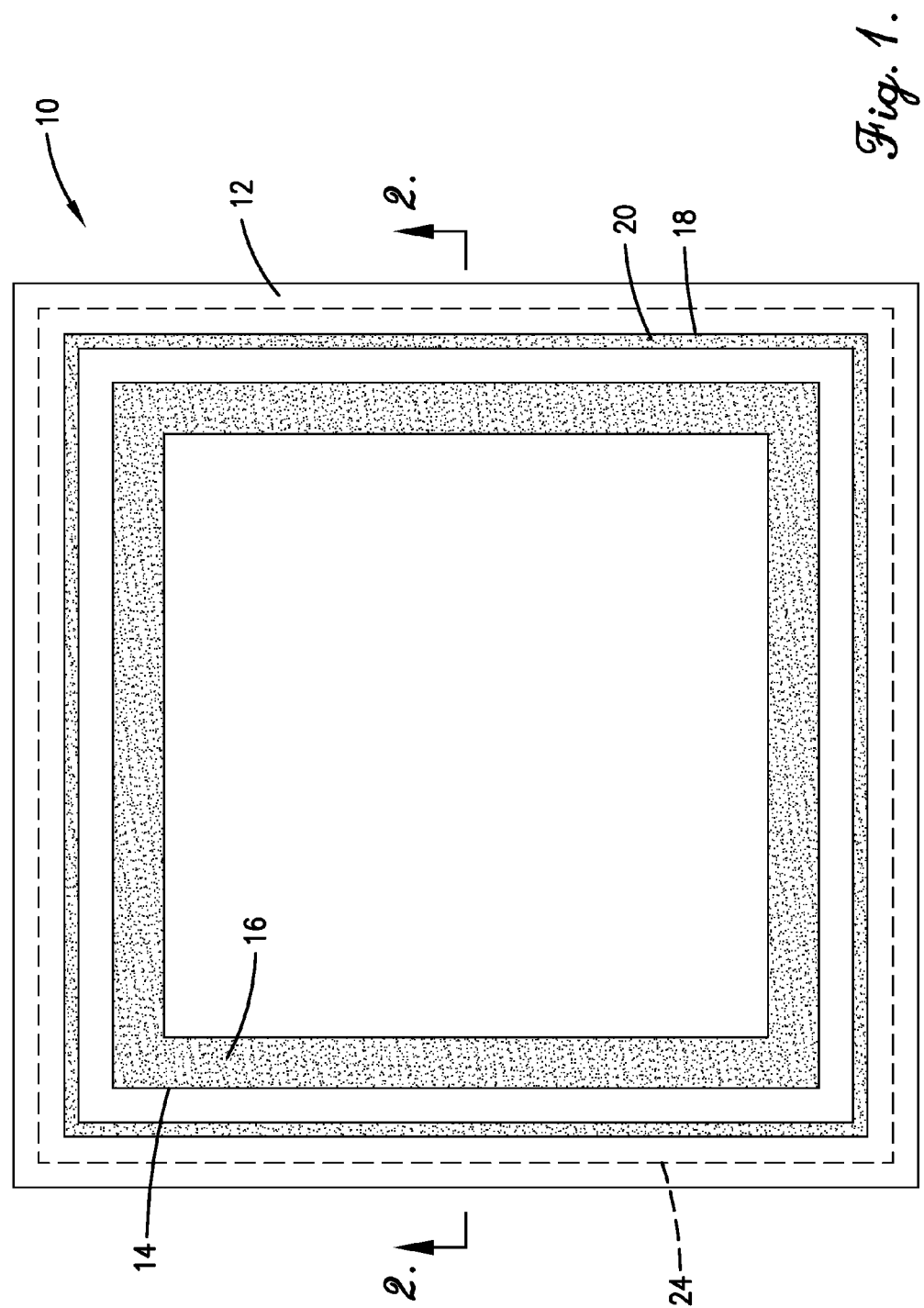

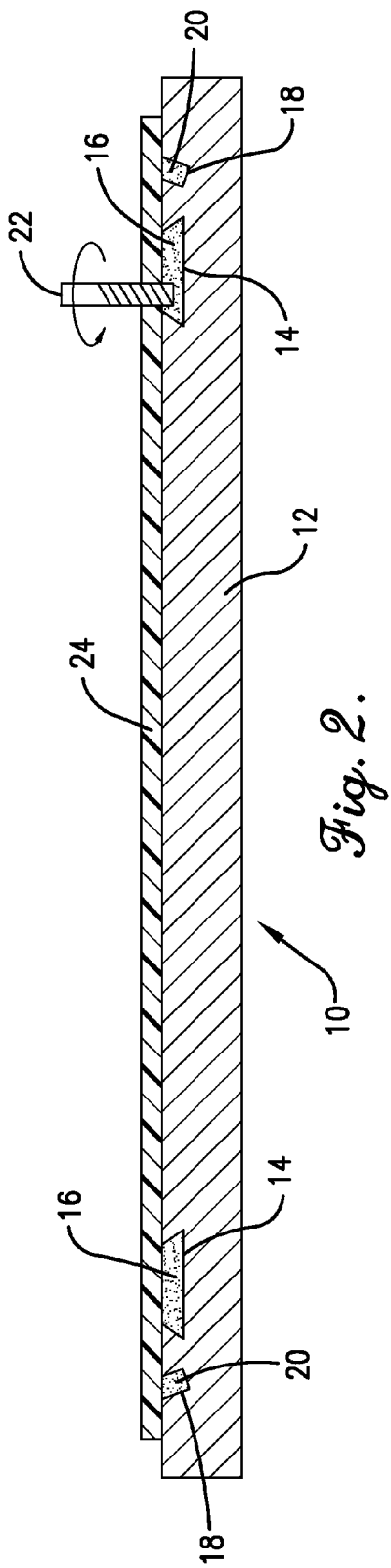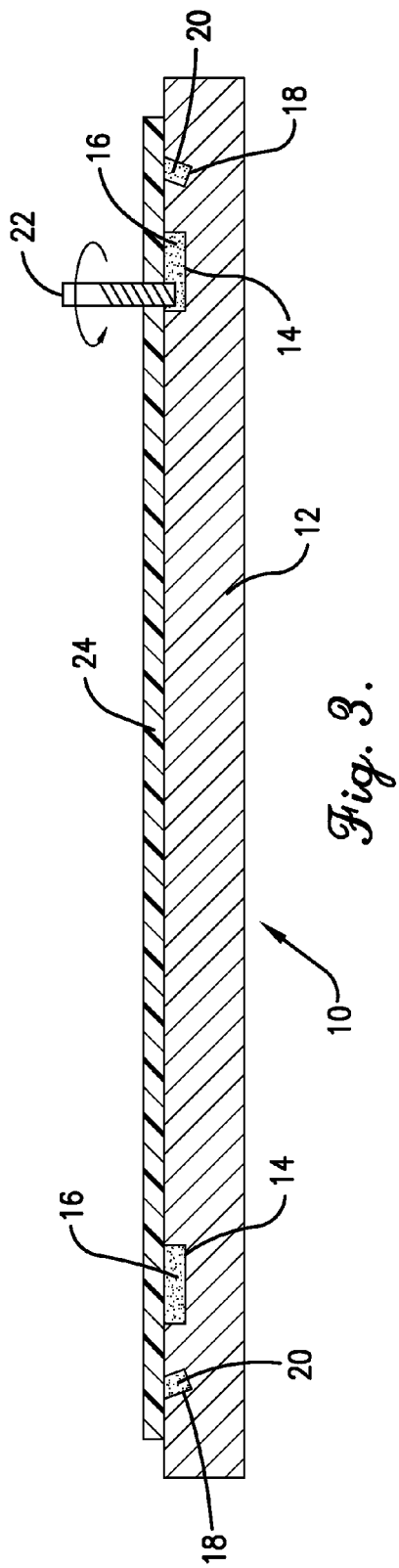

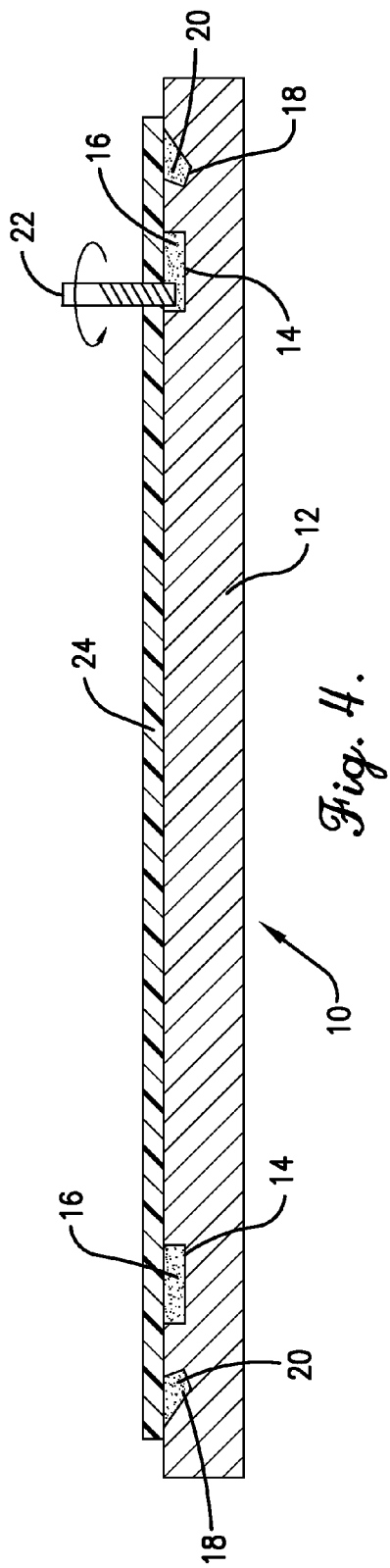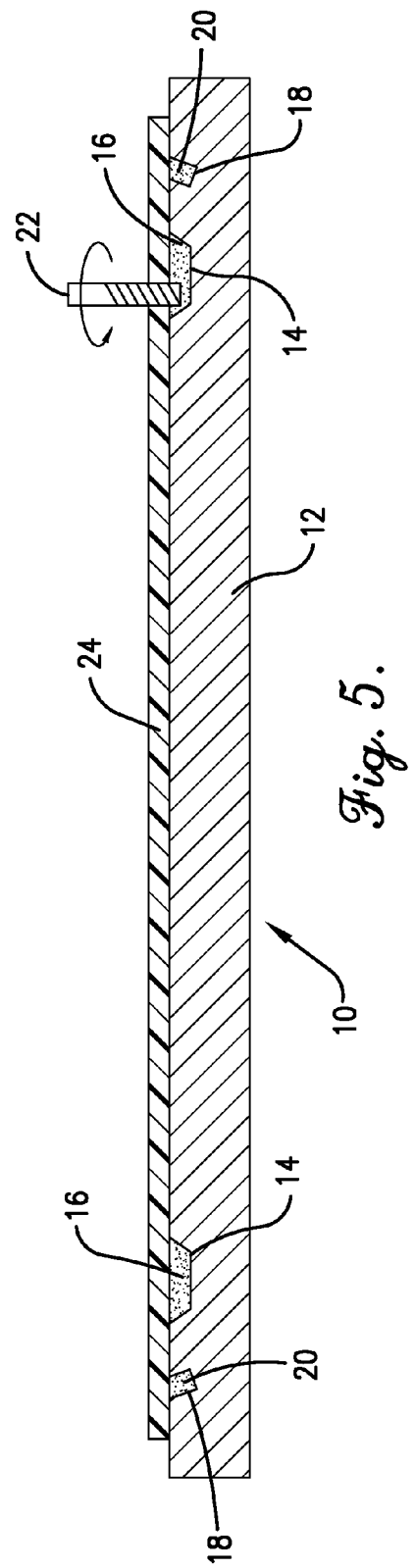

SECONDARY GROOVE FOR WORK PIECE RETENTION DURING MACHINING

BACKGROUND

Parts made of composite materials are used in a variety of industries, including the aircraft industry. To form a composite part, uncured composite laminate material is often placed on a cure tool for autoclave curing and subsequent machining. Specifically, a rigid cure tool can have one or more cutter grooves formed therein with sacrificial material placed therein. Uncured composite material may be placed over the cutter grooves and sacrificial material and then cured into the composite part. To keep the composite material in place during cure, a sacrificial material is selected that is compatible with the cure cycle of the composite material and bonds or adheres to the composite material during cure. A cutting tool cuts through the composite material and into the sacrificial material in the cutter groove to release the composite part from the rigid cure tool. Small amounts of sacrificial material still adhere to the outer edges of the composite part and must be sanded off, cut off, or otherwise removed therefrom, which adds to labor costs and increases the likelihood of damaging the cured composite part. The sacrificial material remaining in the cutter groove after the composite part is removed must be cleaned out of the cutter groove and replaced with new sacrificial material. A high degree of skill is required to achieve an acceptable surface finish on the sacrificial material during replacement.

For highly-contoured composite parts, significant residual stresses may remain after cure and warp or lift the composite part off the tool surface. Hold-down strength of the sacrificial material in the cutter groove may be insufficient to prevent the composite part from separating from the tool. For example, the composite part may separate from the sacrificial material or pull the sacrificial material out of the cutter groove. This separation can lead to inaccuracies while cutting or otherwise machining the cured composite part. A dove-tail configuration of the cutter groove may be used to prevent the sacrificial material from pulling out of the cutter groove, but this trapped geometry also makes the remaining sacrificial material more difficult to clean out of the cutter groove after removal of the cured composite part.

SUMMARY OF THE INVENTION

Embodiments of the present invention solve the above-mentioned problems and provide a distinct advance in the art of manufacturing composite parts. Specifically, embodiments of the present invention may provide a cure tool assembly with a separate cutter groove and securing groove to improve the hold-down force provided to composite material during cure and to simplify the removal of sacrificial material from the cure tool and/or the composite part.

One embodiment of the invention provides a cure tool assembly including a rigid cure tool having an outer surface, peripheral edges, a cutter groove formed into the outer surface, and a securing groove formed around the cutter groove and into the outer surface. The securing groove may have two side walls slanted from the outer surface of the rigid cure tool in a direction angled into the rigid cure tool and away from the peripheral edge of the rigid cure tool. The cure tool assembly may also include a first sacrificial material located in the cutter groove and a second sacrificial material located in the securing groove. A release agent may be included between the securing groove and the second sacrificial material. Furthermore, the release agent may also be used to coat an outer surface of the first sacrificial material, preventing adhesion to composite material placed on the rigid cure tool.

Another embodiment of the invention includes a method of curing a composite material on a rigid cure tool. The method may include placing a first sacrificial material into a cutter groove of the rigid cure tool, placing a second sacrificial material into a securing groove of the rigid cure tool, and placing uncured composite material onto the rigid cure tool and over the cutter groove and securing groove. The method may then include the steps of curing the composite material into a rigid composite part and cutting through the composite part and into the cutter groove to release the rigid composite part from the rigid cure tool. The composite material may bond with the second sacrificial material during cure, creating a desired hold-down force to keep the composite material in place during cure and subsequent machining. A release agent may be applied to an outer surface of the first sacrificial material to prevent the first sacrificial material from adhering to the composite part. The release agent may also be applied within the securing groove to ease subsequent removal of the second sacrificial material from the securing groove.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 1 is a plan view of a rigid cure tool assembly constructed in accordance with various embodiments of the present invention;

FIG. 2 is a cross-sectional view of the rigid cure tool assembly taken along line 2-2 and illustrating a cutter groove having a dove-tail shape;

FIG. 3 is a cross-sectional view of an alternative embodiment of the rigid cure tool assembly with the cutter groove having a rectangular shape FIG. 4 is a cross-sectional view of another alternative embodiment of the rigid cure tool assembly with a secondary groove having non-parallel sidewalls;

FIG. 5 is a cross-sectional view of yet another alternative embodiment of the rigid cure tool assembly with the cutter groove having an inverse dove-tail shape.

Figure 6:
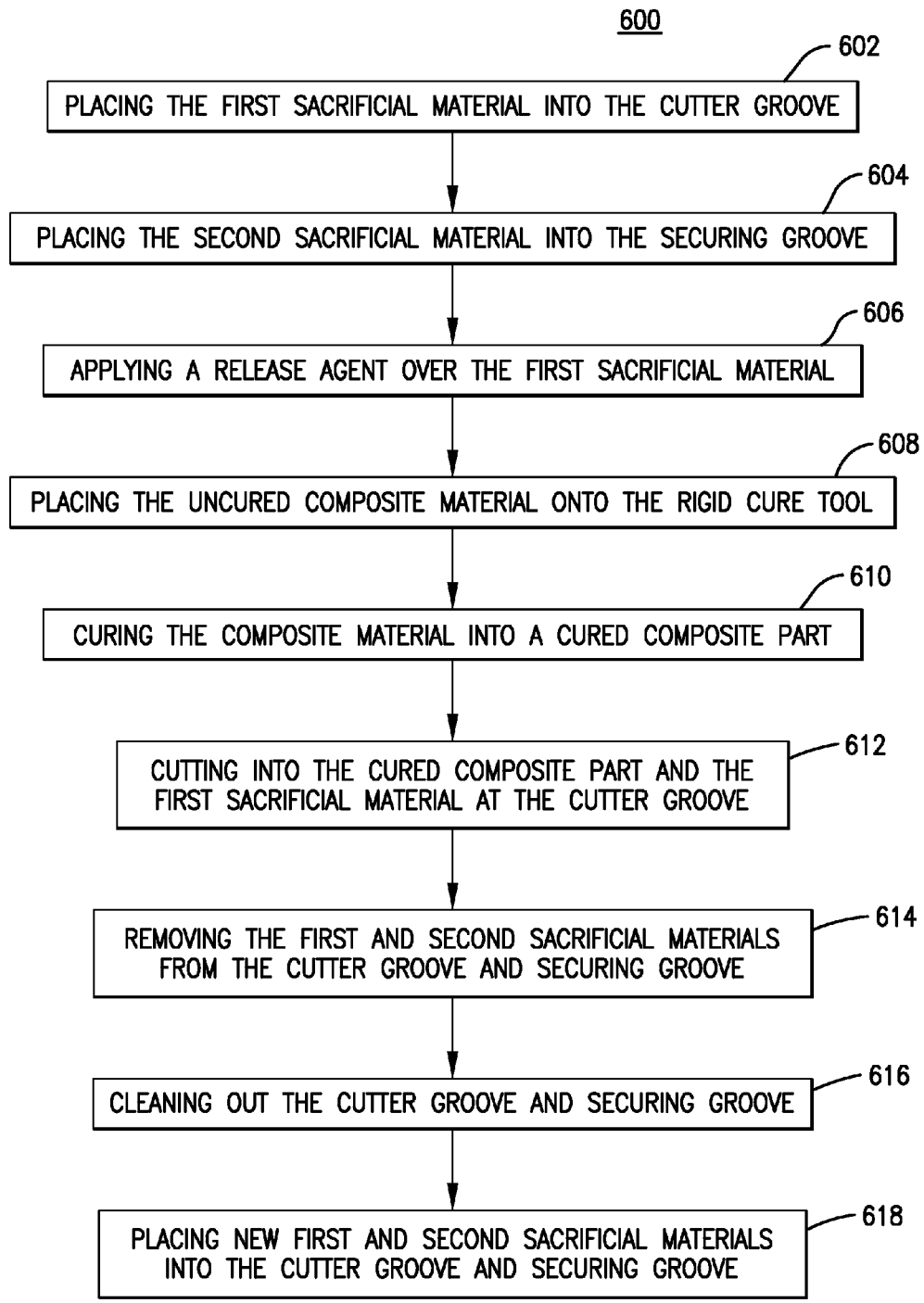
FIG. 6 is a flow diagram of at least a portion of the steps of a method for curing composite material on the rigid cure tool assembly.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A cure tool assembly 10 constructed in accordance with embodiments of the present invention is shown in FIGS. 1-5. Embodiments of the invention are configured for improving placement and removal of composite material 24 on the cure tool assembly 10. The composite material 24, as is known in the art of aerospace manufacturing, may include a reinforcement material and a matrix material. Examples of the composite material 24 that may be used with the present invention include, but are not limited to, fiber materials such as carbon fiber, boron fiber, fiberglass, aramid fiber, ceramic fiber, and the like. In some embodiments of the invention, the composite material 24 may be fiber-based reinforcement materials existing in one of the following forms—either preimpregnated (prepreg) in which the fiber may be coated with a matrix material that is uncured, such as uncured resin, or unenhanced (dry) with no additives to the fiber. The matrix material may include resins, polymers, epoxies, and the like, among others. The composite material 24 may specifically comprise one or more plies of any uncured composite material and may comprise a bottom surface placed against the cure tool assembly 10, a top surface opposite of the bottom surface, and one or more peripheral edges.

The cure tool assembly 10 may comprise a cure tool 12 having at least one cutter groove 14 formed therein and filled with a first sacrificial material 16 and at least one securing groove 18 formed therein and filled with a second sacrificial material 20. The cure tool 12 may support the composite material 24 as it is cured in an oven or autoclave. The cure tool 12 may be any rigid cure tool known in the art and may be made of FeNi36 (i.e., INVAR), graphite, steel, sufficiently rigid aluminum, and the like. The cure tool 12 may also be shaped and configured to influence the shape and configuration of the composite material 24 while it is cured thereon. The cure tool 12 may have at least one outer surface and one or more peripheral edges.

As illustrated in FIG. 2, the cutter groove 14 may form a continuous or substantially continuous boundary of any shape or configuration. For example, the cutter groove 14 may form a rectangular boundary spaced apart from and inward of the securing groove 18, with the peripheral edges of the cure tool 12 spaced apart from and outward of the securing groove 18. In some embodiments of the invention, the cutter groove 14 may comprise a plurality of cutter grooves inward of the securing groove 18 and configured for machining of various shapes, configurations, and features of the composite part. Furthermore, in some embodiments of the invention, the cutter groove 14 or cutter grooves may not be continuous, but may rather have opposing first and second ends.

The cutter groove 14 may have any width and/or depth desired for a given application, and may have any cross-sectional shape. For example, as illustrated in FIG. 2, the cutter groove 14 may have a traditional dove-tail configuration, with a bottom wall and two side walls angled toward each other from the bottom wall to the outer surface of the cure tool 12. The cutter groove 14 may alternatively have a curved cross-sectional configuration, or a square or rectangular cross-section, as illustrated in FIGS. 3-4, with a bottom wall and two side walls substantially perpendicular to the bottom wall and an outer surface of the cure tool 12. In yet another embodiment of the invention, the cutter groove 14 may have an inverted dove-tail configuration, with a bottom wall and two side walls angled away from each other from the bottom wall to an outer surface of the cure tool 12, as illustrated in FIG. 5.

The first sacrificial material 16 may be any suitable material that can be conveniently applied to fill the cutter groove 14 and has sufficient strength, temperature resistance, and other properties to support the composite material 24 during the bonding/curing operation. For example, the first sacrificial material 16 may include a heat expandable self-skinning foam, a graphite/epoxy resin, a potting compound, or various composite materials. In some embodiments of the invention, the first sacrificial material 16 may be placed into the cutter groove 14, smoothed and hardened a desired amount, and coated with a release agent. Specifically, the release agent may be placed over an outer-most surface of the first sacrificial material 16 to prevent the composite material 24 from bonding to it, so that remnants of the first sacrificial material 16 do not remain attached to the composite part periphery after removal from the cure tool 12. The first sacrificial material 16 must have shear strength low enough to be cut into by a cutter trimming tool 22 or other machining tool configured for cutting the composite material 24. The shear strength of the first sacrificial material 16 may be lower than the shear strength of the rigid cure tool 12.

The securing groove 18, as illustrated in FIG. 2, may also form a continuous or substantially continuous boundary of any shape or configuration. For example, the securing groove 18 may form a rectangular boundary spaced apart from and outward of the cutter groove 14. However, the securing groove 18 and the cutter groove 14 may have different shapes and configurations without departing from the scope of the invention. The securing groove 18 may also be spaced apart from and located inward of peripheral edges of the cure tool 12. Segments of the securing groove 18, such as individual sides of the rectangular boundary formed by the securing groove 18, may be positioned opposite each other to cooperatively provide hold-down force to the composite material 24 via the second sacrificial material 20 therein, as described below. In some embodiments of the invention, the securing groove 18 may comprise a plurality of discrete securing grooves at opposing locations from each other and still outward of the cutter groove 14. This plurality of discrete securing grooves may also be filled with the second sacrificial material 20, as described below.

The securing groove 18 may have any width and/or depth desired for a given application, and may have any cross-sectional shape. In some embodiments of the invention, the securing groove 18 may form a slanted channel, with a bottom wall and two side walls angled away from the cutter groove 14 and in a direction toward peripheral edges of the cure tool 12, as illustrated in FIGS. 2-5. The two side walls may be substantially perpendicular with each other, as in FIGS. 2, 3, and 5, or at least one of the sidewalls may extend toward the peripheral edges of the cure tool 12 at a greater angle than the other of the sidewalls, as illustrated in FIG. 4. In any of these configurations, the securing groove 18, in conjunction with the second sacrificial material 20 therein, may be configured to serve as a mechanical lock to the cure tool 12, when bonded or adhered to the composite material 24 during cure. For example, as illustrated in FIGS. 2-5, the slant of the securing groove 18 at opposing segments of the rectangular boundary formed thereby create opposing hold-down forces near opposite edges of the composite material 24.

The second sacrificial material 20 may be any suitable material that can be conveniently applied to fill the securing groove 18 and has sufficient strength, temperature resistance, and other properties to support the composite material 24 during the bonding/curing operation. For example, the second sacrificial material 20 may include a heat expandable self-skinning foam, a graphite/epoxy resin, a film adhesive, or various composite materials. In some embodiments of the invention, no release agent is applied to the second sacrificial material 20, since the second sacrificial material 20 is configured to adhere and/or bond to the composite material 24 during cure. However, some surfaces of the second sacrificial material 20 may be coated with a release agent to assist in removal of the release agent from the rigid cure tool 12 following curing of the composite part. For example, the securing groove 18 may be coated with a release agent that rests between the second sacrificial material 20 and the securing groove 18. However, an exposed surface of the second sacrificial material 20 intended to contact the composite material 24 may be free of any release agent to bond to and provide hold-down force to the composite material 24 during cure.

The strength of the second sacrificial material may be the same or greater than the strength of the first sacrificial material 20. The strength of the first sacrificial material 20 must only be sufficient to prevent crushing under autoclave pressure, which may be, for example, approximately 90 psi. However, the strength of the second sacrificial material 20 must be strong enough to prevent crushing thereof and provide sufficient hold-down strength to the composite material 24 during cure. The second sacrificial material 20 does not necessarily require shear strength low enough to be cut into by the cutter trimming tool 22 or other machining tool configured for cutting the composite material 24. However, the second sacrificial material 20 may need to have shear strength low enough to facilitate removal of the second sacrificial material 20 from the securing groove 18 of the rigid cure tool 12. The shear strength of the second sacrificial material 20 may be lower than the shear strength of the rigid cure tool 12.

Surface finish of the second sacrificial material 20 is inconsequential, since the securing groove 18 is located outward of the cutter groove 14 and thus is attached to a portion of the composite material 24 that will be excess once the cured composite part is cut through the cutter groove 14 and freed from the cure tool 12. However, the surface finish of the first sacrificial material 16 must remain substantially smooth and flush with the outer surface of the cure tool 12, such that the composite part is cured with a substantially smooth surface.

In use, the first and second sacrificial materials 16,20 are placed into the cutter groove 14 and the securing groove 18, respectively, and the uncured composite material 24 is placed onto the outer surface of the cure tool 12. In some embodiments of the invention, release agent is also applied to the first sacrificial material 16, and forms a release barrier between the uncured composite material 24 and the first sacrificial material 16, preventing adhesion during cure. The composite material 24 is then cured into a composite part and simultaneously bonded (via curing) to the second sacrificial material 20 in the securing groove 18, providing hold-down strength to keep the composite part in place during cure and cutting. Once cured, the composite part is cut, with a cutting device pressing toward the cure tool 12 from the top surface of the composite material 24, and into the cutter groove 14. This releases the composite part from the cure tool 12 and from peripheral portions of the composite material 24 that were bonded to the second sacrificial material 20 in the securing groove 18.

FIG. 6 illustrates steps in a method 600 for placing, retaining, and removing composite material, in accordance with various embodiments of the present invention. The steps of the method 600 may be performed in the order as shown in FIG. 6, or they may be performed in a different order. Furthermore, some steps may be performed concurrently as opposed to sequentially. In addition, some steps may not be performed.

The method 600 may include the steps of placing the first sacrificial material 16 into the cutter groove 14, as depicted in block 602, placing the second sacrificial material 20 into the securing groove 18, as depicted in block 604, and applying a release agent over the first sacrificial material 16, as depicted in block 606, such that the uncured composite material 24 does not bond to the first sacrificial material 16 during curing. Next, the method 600 may include the steps of placing the uncured composite material 24 onto the rigid cure tool 12, as depicted in block 608, also covering the first sacrificial material 16 and the second sacrificial material 20 with the uncured composite material 24, and then curing the composite material 24 into a cured composite part, as depicted in block 610.

In some embodiments of the invention, the first and/or second sacrificial material 16,20 may need to be pre-cured within the cutter groove 14 and securing groove 18 respectively before the step of applying the release agent and/or placing the uncured composite material 24 onto the cure tool 12. Furthermore, as noted above, a release agent may be applied to the securing groove 18 prior to step 604. Various conventional steps not described in detail herein for curing a composite part may also be performed. For example, a vacuum bag or other impermeable membrane may be placed over the composite material 24 and sealed to the rigid cure tool 12. Vacuum or a pressure-differential introduced in the autoclave during cure may cause the vacuum bag or impermeable membrane to compress against the composite material 24 and the cure tool 12.

As described above, the second sacrificial material 20 is configured to bond to the composite material 24 during the curing step. Because the securing groove 18 is substantially slanted, extending, from the outer surface of the rigid cure tool 12, inward in a direction angled away from the peripheral edge of the rigid cure tool 12, opposing segments of the slanted-inward securing groove 18 provide a locking mechanism, providing a greater hold-down strength to the composite material 24 than prior art methods described above.

After cure, the method 600 may then include a step of cutting into the cured composite part and the first sacrificial material 16 at the cutter groove 14, as depicted in block 612, thereby releasing a portion of the cured composite part from the rigid cure tool 12. The portion released from the cure tool 12 is the composite part, while the portion remaining on the cure tool 12 is merely scrap material. The first sacrificial material 16 naturally releases from cut edges of the cured composite part because of the release agent applied to the first sacrificial material 16.

Finally, after the step of cutting the cured composite material 24, the method 600 may include the steps of removing the first and second sacrificial materials 16,20 from the cutter groove 14 and the securing groove 18, as depicted in block 614, cleaning the cutter groove 14 and the securing groove 18, as depicted in block 616, and placing new first and second sacrificial materials 16,20 into the cutter groove 14 and the securing groove 18 respectively, as depicted in block 618. Removing and/or cleaning the sacrificial materials 16,20 out of the grooves 16,18 may require various chemical and/or mechanical processes known in the art. In embodiments of the invention where release agent is applied to surfaces of the securing groove 18, the second sacrificial material 20 may simply be pulled out after the composite part is cut and removed. That is, without continuous composite material extending between the opposing segments of the groove, the hold-down force is greatly reduced, allowing the second sacrificial material 20 to easily be pulled out of the securing groove 18 covered with release agent.

Advantageously, the slanted configuration of the securing groove 18, and particularly the opposing forces provided by the opposing segments of the securing groove 18, provides a greater hold-down force to the composite material 24, via its bond to the second sacrificial material 20, than prior art methods. This configuration also provides hold-down force without requiring a trapped geometry for the securing grooves 18, such as dove-tail shapes used in some cutter grooves. Furthermore, because the portion of the composite material 24 attached to the second sacrificial 20 material is cut from the finished composite part, the surface finish of the second sacrificial material is inconsequential. This saves time in manufacturing the cure tool assembly 10, since the second sacrificial material 20 does not require time-consuming surface finishing techniques.

Since the securing groove 18 and its secondary filler material 20 carry the primary loads for securing the composite material to the cure tool 12, the cutter groove 14 no longer needs a dove-tail configuration for hold-down, and can instead have vertical sidewalls or an inverted dove-tail configuration, which makes removal of the first sacrificial material easier. Furthermore, lower strength materials can be selected for the first sacrificial material, providing easier installation and/or cost savings. Because the hold-down force is provided by the securing groove 18, the cutter groove 14 can have release agent applied thereon so that the first sacrificial material 16 does not stick to the edges of the cured composite part after it is cut along the cutter groove 14.

Another advantage of the present invention is that, because the cutter groove 14 is separate from the securing groove 18, the scrap material of the cured composite material 24 left behind after the cutting step remains secured to the cure tool 12 via the second sacrificial material 20. This prevents the scrap material from popping away from the cure tool 12 and getting snagged by or pulled into the cutter trimming tool 22, which could damage the cutter trimming tool 22.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A cure tool assembly comprising:
  a rigid cure tool having an outer surface, at least one peripheral edge, a cutter groove formed into the outer surface, and a securing groove formed into the outer surface and located outward of the cutter groove and substantially surrounding the cutter groove;
  a first sacrificial material located in and cured within the cutter groove; and
  a second sacrificial material located in the securing groove, wherein the first and second sacrificial materials have a lower shear strength than the rigid cure tool,
  wherein the first sacrificial material in the cutter groove is coated with a release agent sufficient to prevent a composite material from bonding to the first sacrificial material during cure, and the second sacrificial material is configured to bond to the composite material during cure.

2. The cure tool assembly of claim 1, wherein the cutter groove is substantially continuous, and the securing groove is substantially continuous and extends around the cutter groove, wherein the securing groove is positioned between the cutter groove and the peripheral edge of the rigid cure tool.

3. The cure tool assembly of claim 1, wherein the securing groove is substantially slanted from the outer surface of the rigid cure tool in a direction inward, away from the peripheral edge of the rigid cure tool.

4. The cure tool assembly of claim 1, wherein the cutter groove has a cross-sectional shape that is a dove-tail configuration, an inverse dove-tail configuration, a curved configuration, a square configuration, or a rectangular configuration.

5. The cure tool assembly of claim 1, further comprising a release agent between the securing groove and the second sacrificial material.

6. The cure tool assembly of claim 1, wherein the first sacrificial material has a lower strength than the second sacrificial material.

7. A cure tool assembly comprising:
  a rigid cure tool having an outer surface, at least one peripheral edge, a cutter groove formed into the outer surface, and a securing groove formed into the outer surface and located outward of the cutter groove and substantially surrounding the cutter groove;
  a first sacrificial material located in and cured within the cutter groove;
  a second sacrificial material located in the securing groove, wherein the first and second sacrificial materials have a lower shear strength than the rigid cure tool; and
  a release agent between the securing groove and the second sacrificial material.

8. A cure tool assembly comprising:
  a rigid cure tool having an outer surface and peripheral edges, wherein the outer surface has a continuous cutter groove formed therein and a continuous securing groove formed therein, wherein the securing groove is located between the peripheral edges and the cutter groove and surrounding the cutter groove, wherein the securing groove comprises two side walls slanted from the outer surface of the rigid cure tool in a direction angled into the rigid cure tool and away from the peripheral edge of the rigid cure tool;

a first sacrificial material located in and cured within the cutter groove; and a second sacrificial material located in the securing groove, wherein the first and second sacrificial materials have a lower shear strength than the rigid cure tool, wherein the first sacrificial material in the cutter groove is coated with a release agent sufficient to prevent a composite material from bonding to the first sacrificial material during cure, wherein the second sacrificial material is configured to bond to the composite material during cure, wherein the release agent is further located between the securing groove and the second sacrificial material.

9. The cure tool assembly of claim 8, wherein the cutter groove has a cross-sectional shape that is a dove-tail configuration, an inverse dove-tail configuration, a curved configuration, a square configuration, or a rectangular configuration.

10. The cure tool assembly of claim 8, wherein the first sacrificial material has a lower strength than the second sacrificial material.

11. The cure tool assembly of claim 8, wherein the securing groove comprises opposing segments angled in opposite directions from each other.

12. The cure tool assembly of claim 11, wherein the opposing segments are sides of a substantially square or rectangular configuration formed by the continuous securing groove.

13. A method for curing uncured composite material, the method comprising:

placing a first sacrificial material into a cutter groove formed into an outer surface of a rigid cure tool;

applying a release agent over the first sacrificial material;

placing a second sacrificial material into a securing groove formed into the outer surface of the rigid cure tool at a location between the cutter groove and a peripheral edge of the rigid cure tool;

placing the uncured composite material onto the rigid cure tool, covering the first sacrificial material, the release agent, and the second sacrificial material with the uncured composite material;

curing the composite material into a cured composite part, wherein the second sacrificial material is configured to bond to the composite material during cure and the first sacrificial material is prevented from bonding to the uncured composite material via the release agent during curing; and cutting into the cured composite part and the first sacrificial material at the cutter groove, thereby releasing a portion of the cured composite part from the rigid cure tool.

14. The method of claim 13, wherein the securing groove is substantially slanted, extending, from the outer surface of the rigid cure tool, inward in a direction angled away from the peripheral edge of the rigid cure tool.

15. The method of claim 13, wherein the second sacrificial material is stronger than the first sacrificial material.

16. The method of claim 13, wherein the shear strength of the cure tool is greater than the shear strength of the first sacrificial material.

17. The method of claim 13, further comprising removing the first and second sacrificial materials from the cutter groove and the securing groove after the step of cutting the cured composite part.

18. The method of claim 13, further comprising applying a release agent in the securing groove prior to placement of the second sacrificial material.

19. A method for curing uncured composite material, the method comprising:

placing a first sacrificial material into a cutter groove formed into an outer surface of a rigid cure tool;

applying a release agent in a securing groove formed into the outer surface of the rigid cure tool at a location between the cutter groove and a peripheral edge of the rigid cure tool;

placing a second sacrificial material into the securing groove after application of the release agent therein;

placing the uncured composite material onto the rigid cure tool, covering the first sacrificial material and the second sacrificial material with the uncured composite material;

curing the composite material into a cured composite part, wherein the second sacrificial material is configured to bond to the composite material during cure; and cutting into the cured composite part and the first sacrificial material at the cutter groove, thereby releasing a portion of the cured composite part from the rigid cure tool.

* * * * *